United States Patent [19]

Golden

[11] Patent Number: 4,897,870
[45] Date of Patent: Jan. 30, 1990

[54] NETWORK IMPLEMENTED PAY TELEPHONE SET

[75] Inventor: Michael E. Golden, Reston, Va.

[73] Assignee: Southlake Technologies, Inc., Reston, Va.

[21] Appl. No.: 54,051

[22] Filed: May 26, 1987

Related U.S. Application Data

[63] Continuation of Ser. No. 779,981, Sep. 25, 1985, abandoned.

[51] Int. Cl.⁴ .......................................... H04M 17/02
[52] U.S. Cl. .................................... 379/144; 379/91
[58] Field of Search ............ 379/91, 144, 59, 60; 235/482, 486

[56] References Cited

U.S. PATENT DOCUMENTS

| | | | |
|---|---|---|---|
| 3,920,908 | 11/1975 | Kraus | 379/91 |
| 4,162,377 | 7/1979 | Mearns | 179/18 D |
| 4,277,651 | 7/1981 | Fisher, II et al. | 179/90 B |
| 4,310,727 | 1/1982 | Lawser | 179/18 B |
| 4,393,496 | 7/1983 | Zeiträeg | 370/62 |
| 4,439,636 | 3/1984 | Newkirk et al. | 179/7.1 R |
| 4,450,321 | 5/1984 | Quigley et al. | 179/1.5 M |
| 4,468,529 | 8/1984 | Samuel et al. | 179/18 BA |
| 4,482,786 | 11/1984 | Flynn, Jr. | 179/90 B |
| 4,513,175 | 4/1985 | Smith | 179/18 BA |
| 4,587,379 | 5/1986 | Masuda | 379/91 |
| 4,588,863 | 5/1986 | Ress | 179/90 BD |
| 4,591,661 | 5/1986 | Benedetto et al. | 179/2 EA |

Primary Examiner—Robert Lev
Attorney, Agent, or Firm—Banner, Birch, McKie & Beckett

[57] ABSTRACT

A pay telephone system which does not require the use of dedicated facilities in a telephone company and central office and which provides more efficient means for utilizing existing facilities to place public telephone calls. For only selected user telephone numbers, the telephone system places a set-up call to a call processor to request billing and other information needed to process the call at the local processor. The set-up call is then terminated and the user's call is automatically redialed into the switched telephone network from the telephone central office which serves the telephone presently being used. Numbers other than the selected numbers are called directly.

21 Claims, 12 Drawing Sheets

NETWORK IMPLEMENTED PAY TELEPHONE SET

This application is a continuation, of application Ser. No. 779,981, filed Sept. 25, 1985 now abandoned.

BACKGROUND OF THE INVENTION

The present invention generally relates to the field of telecommunications, and more particularly, is directed to a pay telephone system which does not require the use of dedicated facilities in a telephone company local central office for each phone, and which provides a more efficient means of utilizing existing facilities for placing calls from public telephones while concurrently expanding the possible range of services and convenience to the caller.

Figure 1:
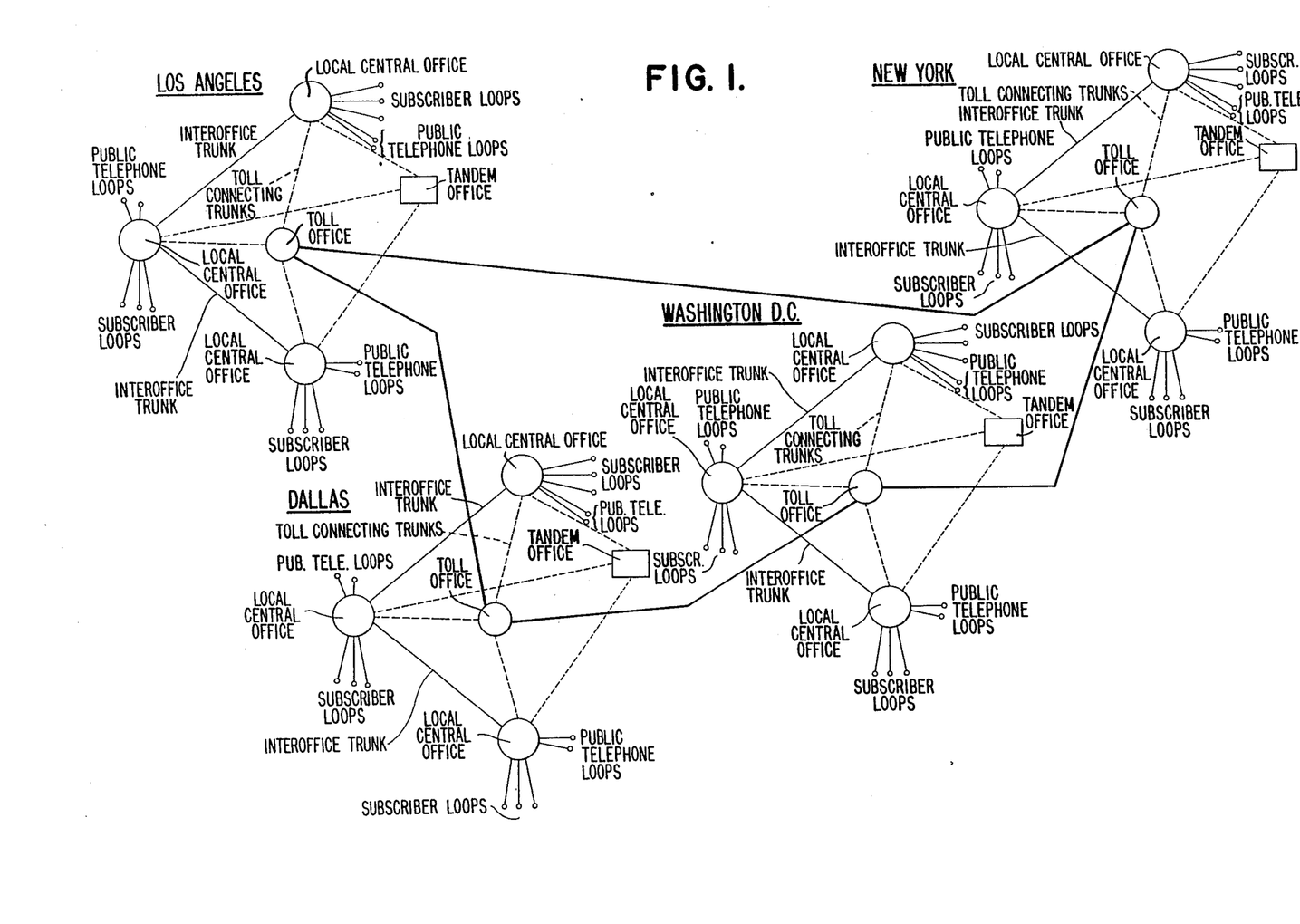
FIG. 1 is a block diagram illustrating the switching centers and subscriber loops of a conventional telephone system showing several cities interconnected.

FIG. 1 is a block diagram showing a conventional switched telephone network interconnecting several metropolitan areas. The switching centers in each area are virtually the same in terms of function and differ only in number depending on the size of the area served and number of telephone set subscribers. The number of switching centers for each city in FIG. 1 is shown as being equal merely for purposes of simplicity.

Figure 2:
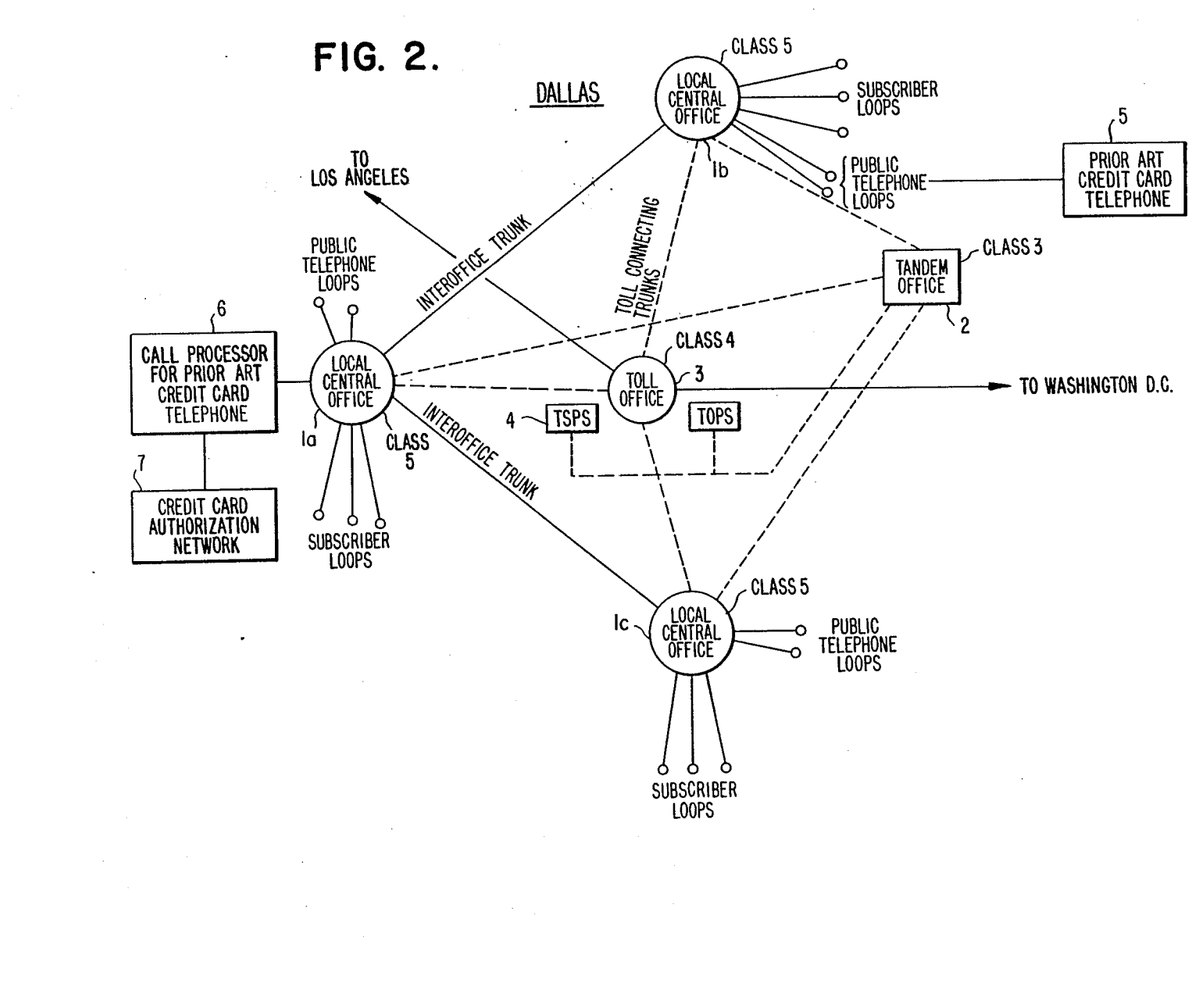
FIG. 2 is a further block diagram of the switching centers and subscriber loops for one of the cities shown in FIG. 1.

With reference to FIG. 2, the switching centers for a typical metropolitan area, i.e., the city of Dallas shown in FIG. 1, will be explained. Each subscriber telephone set is connected to a local central office 1, via a subscriber loop. When a subscriber wishes to place a local call and dials the seven digit telephone number, the first three digits identify the central office which serves the party being called and the last four digits identify the particular telephone within that central office. For example, when a subscriber served by central office 1a wishes to call a party served by central office 1b, central office 1a recognizes the first three digits of the telephone number as identifying central office 1b. The subscriber's telephone is then connected through central office 1a to central office 1b via an interoffice trunk. Central office 1b then uses the last four digits of the telephone number to identify the particular subscriber loop to which the party being called is connected and connects and rings that party's telephone.

Each central office in the system is also connected to a tandem office 2. The purpose of tandem office 2 is to simply switching between central offices and is itself not directly connected to any subscriber lines. Tandem offices located in central places provide more efficient switching by combining small amounts of traffic from the various central offices and routing the combined traffic over a common trunk to the required destination. Thus, direct interconnection of all central offices may be eliminated or the number of interoffice trunks greatly reduced.

When a subscriber wishes to make a long distant call, the call is routed from the subscriber's central office to a toll office 3. Toll office 3 is interconnected by long distance lines to toll offices in other metropolitan areas across the country. Depending on the amount of long distance traffic, a caller in New York wishing to call, for example, Los Angeles may be routed directly to Los Angeles or via alternate routes, such as through Washington, D.C. and Dallas as shown in FIG. 1.

As shown in FIG. 2, each central office 1 also services a plurality of public pay telephones via dedicated pay telephone lines. When a caller uses a pay telephone, the central office which serves the telephone waits to receive tones transmitted from the telephone which indictes that the initial rate has been deposited in the telephone. The dialed number is then screened by the central office and if the screening indicates that the call is local station-to-station and the local rate has not been satisfied, the call is routed to a central office announcement which tells the caller the amount of the deposit he must make to complete the call and to hang-up and try again. If the call was recognized as being a long distance call or was prefixed by a "0" (indicating that the caller wished alternate billing treatment and did not wish to pay by coin), then the call is routed by trunk lines to a traffic service position systems shown as TSPS 4 in FIG. 2. TSPS 4 is normally located in a tandem office and serves a plurality of local offices 1. It receives and processes the dialed telephone number. If the telephone number is not prefixed by "0", then TSPS 4 calculates the initial charge for the call based on the locations of the calling phone and the dialed number. TSPS 4 then waits for tones to be transmitted from the pay telephone indicating that the initial deposit requested was satisfied. When this signal is received, TSPS 4 then redials the call through toll office 3. This of course means that *all* nonlocal pay telephone calls must be "hauled" to the tandem office for processing and are then transmitted into the network from that point.

Also known in the prior art are pay telephones which include credit card readers which permit the telephone call to be charged to the caller's telephone company account. Such telephones are indicated by reference No. 5 in FIG. 2 and are also connected to dedicated pay telephone loops from a telephone company central office. When one of these types of pay telephones is used, the call is not forwarded to TSPS 4 but rather is forwarded to call processor 6. Call processor 6 contains the credit card number and verifies that the credit card is valid and that the caller's account is in good standing from information stored in credit card authorization network 7. If the card is valid and the caller's account is in good standing, call processor 6 creates a billing record for later debiting of the caller's account then redials the number back into the switching network and times the call through to completion. The billing information is then later retrieved and used for pricing and billing of the call.

The invention of the telephone and the complex switching network which makes it useful has permitted a quantum leap in man's ability to communicate. Unfortunately, the economics of capital investment and the demand for telephone service has made it difficult to implement improvements in the telephone system infrastructure as rapidly or with as much variety as technology permits. The presentday switched telephone network and network architecture evolved at a time when there was only one long distance carrier. Thus, there was no need to design the system to accommodate other carriers or to provide telephone subscribers with the ability to select a particular carrier. However, recent changes in the telecommunications industry have lead to the formation of a number of long distance carriers from which the consuming public may select for long distance telephone service. Unfortunately, the present switched telephone network does not permit the public or the telephone owner to select the long distance carrier of its choice in every situation. This is especially true with respect to pay telephones which presently rely on special telephone lines from a telephone company central office. The present invention overcomes these problems.

SUMMARY OF THE INVENTION

It is the overall object of the present invention to provide a pay telephone system which does not require, but may be, connected to special purpose coin telephone lines from a telephone company central office.

It is a specific object of the present invention to provide a pay telephone set which can be connected to virtually any subscriber telephone line or special coin circuit without requiring any changes in the conventional telephone company central office.

It is another specific object of the present invention to provide a pay telephone set which is extremely self-sufficient and can be programmed to provide a wide variety additional features or changes in features when desired.

It is a still further specific object of the present invention to provide a pay telephone set which permits the user to pay for the call using a major credit card of the user's choice.

It is a another specific object of the present invention to provide a pay telephone set which can permit the user to select the long distance carrier of the user's choice when making a long distance call.

It is another specific object of the present invention to provide a pay telephone set having the above features and advantages which is a direct replacement for pay telephone sets known in the prior art.

It is another specific object of the present invention to provide a pay telephone set having the above features and advantages which is easy to use while at the same time being reliable in operation and efficient and flexible in its use of existing network facilities.

It is a further specific object of the present invention to provide a retrofit package for conversion of pay telephone sets known in the prior art to telephone sets having the above features and advantages.

These and other objects of the present invention are achieved by providing a pay telephone system which from time to time interconnects to a centrally located call processor prior to actually placing a call dialed by the user into the conventional switched telephone network. This is accomplished by the telephone set automatically placing a call to a call processor over the switched telephone network in order to obtain additional information which may be needed to complete certain classes of calls while the user is concurrently performing other actions, such as dialing his desired telephone number, entering credit card information (manually or electronically with a card reader) or depositing coins into the telephone set, etc.

When connected to the call processor during this initial "set up" period, the telephone set may receive from the call processor such information as whether the caller's credit card number is approved or the amount to collect in coins for the call requested by the user's dialing instructions. After receiving this information from the call processor, the telephone set terminates the call to the call processor and uses the information obtained to independently complete the call requested by the user by dialing the stored telephone number into the switched telephone network as a second call. Using the information obtained from the call processor, the telephone set can then independently calculate the initial rate and ongoing charges needed to maintain the call and can accrue this information in a stored transaction record and/or request additional coin deposits from the user as required.

Not all classes of calls require information to be obtained from the call processor. In those cases, the call pricing and/or carrier routing information is obtained from locally stored information in the telephone set itself. Calls which do not require the call processor are also stored as a transaction record in the telephone. The system is arranged so that a plurality of stored transaction records may be transferred to the call processor during the next required connection to the call processor, thereby eliminating the need for a special connection to the call processor solely for the purpose of transfering call transaction records to a central point.

Another feature of the present invention overcomes the potentially long delays and customer confusion that might result if the initial call to the call processor was placed by an ordinary telephone set and was audible to the caller. The invention solves this problem by using a system of double buffering in which the actions of, and audible feed-back to, the caller are isolated from the actions of the telephone set in its interactions with the switched telephone network. Specifically, the telephone set is capable of generating a local dial tone, dial button feed-back tones, side tone, synthesized voice messages and other miscellaneous tones and signals for the caller independently of the telephone set's connection status with the switched network and concurrently with any calls that the set may place to call processors or other computer systems through the switched network to obtain call pricing, credit card authorization, other information or instruction information. The advantage of this approach over the prior art is that a short duration call can be placed to a central pricing/credit authorization processor location only on selected classes of calls while the actual longer duration telephone call can be introduced directly into the switched telephone network from the point nearest the telephone. Thus, there is no need for the call to be routed to a distant central location at significant cost before introduction into the switched network as would happen if the pricing/credit authorization functions were not separated from the actual call; and the switching and call processing functions were co-located as has been historically the case in the prior art.

DESCRIPTION OF THE PREFERRED EMBODIMENT

Figure 3:
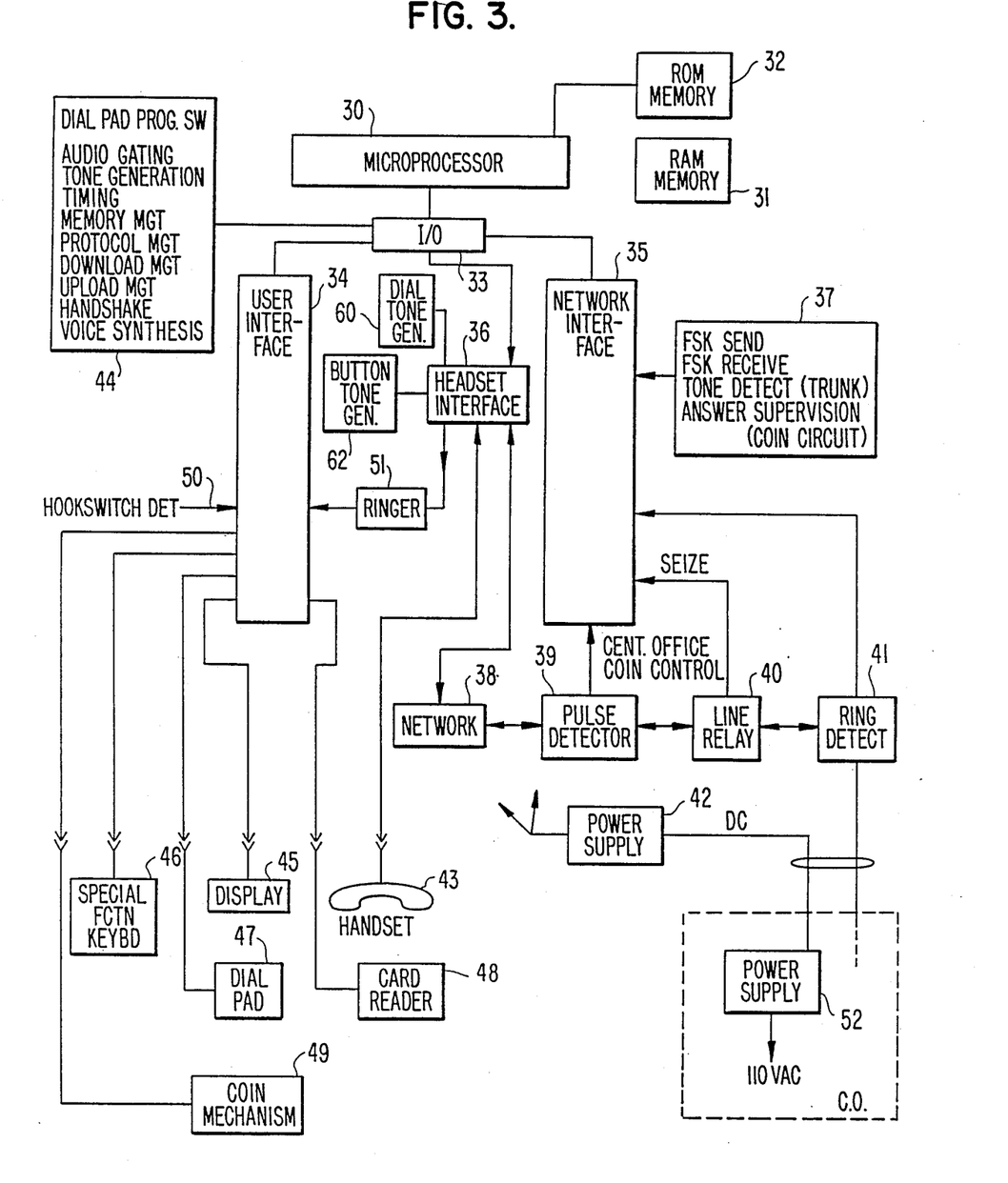
FIG. 3 is a block diagram of a pay telephone set in accordance with the present invention.

The pay telephone set of the present invention includes a number of interconnected electronic and electromechanical elements as shown in FIG. 3. The set includes a microprocessor 30, RAM memory 31 and ROM memory 32 where instructions and temporary data storage areas of a computer program reside and peripheral I/O ports 33 which allow microprocessor 30 to communicate with the outside world. RAM 31 is of the non-volatile type which retains its data for a period of time after a loss of power. Thus, the system is protected from temporary losses of power. User interface 34 and network interface 35 are connected to I/O ports 33 along with handset interface 36.

User interface 34 is isolated from network interface 35, each interface operating in a manner transparent to the other. User interface 34 is primarily responsible for communications between the user and microprocessor 30 while network interface 35 is responsible for communications between the telephone switched network and microprocessor 30. The isolation or double buffering provided by user interface 34 and network interface 35 isolates the actions of the users and the audible feedback to the user from the actions of the telephone set in its interactions with the switched telephone network. Thus, the caller is not confused by extraneous dialing tones and data transmissions into the switched network.

As shown in FIG. 3, a hookswitch detector signal 50 is provided as an input to user interface 34. The presence of this signal indicates that telephone handset 43 has been removed from its cradle in preparation for a call. As used herein, the term "handset" is also intended to apply to other telephone peripherals such as telephone speaker phones and the like. In response to signal 50, microprocessor 30 enables dial tone generator 60 so that a dial tone is supplied to handset 43 and also provides a "Select Method of Payment" prompt to the user via display 45. Display 45 is an alphanumeric display which can provide several lines of prompt and system status information to the user. Using special function keypad 46, the user may elect to pay for the call by coin or by using a major credit card. When the method of payment is selected, a method of payment flag is set in accordance with the selection. The flag is stored in RAM 31 for future reference.

The use of a select method of payment prompt can be avoided by merely having microprocessor 30 monitor the card reader for the presence of a card or the coin mechanism for the presence of a coin. The presence of one or the other would automatically signal the method of payment to microprocessor 30.

If payment by credit card is selected, microprocessor 30 prompts the user to pass his credit card through card reader 48. Card reader 48 is conventional in construction and is adapted to read data encoded on a magnetic stripe on the back of a credit or bank card as is known in the art. The type of credit card and the user's account number are read from the card and temporarily stored in RAM 31. If the credit card requires a personal identification number (PIN), microprocessor 30 prompts the user to enter his PIN number using dial pad 47. The PIN number is added to the user's account number and stored in RAM 31 as well. Microprocessor 30 then prompts the user to dial the number he wishes to call using dial pad 47. As each digit of the telephone number is entered by the user, it is screened by microprocessor 30 and temporarily stored in RAM 31.

Figure 4:
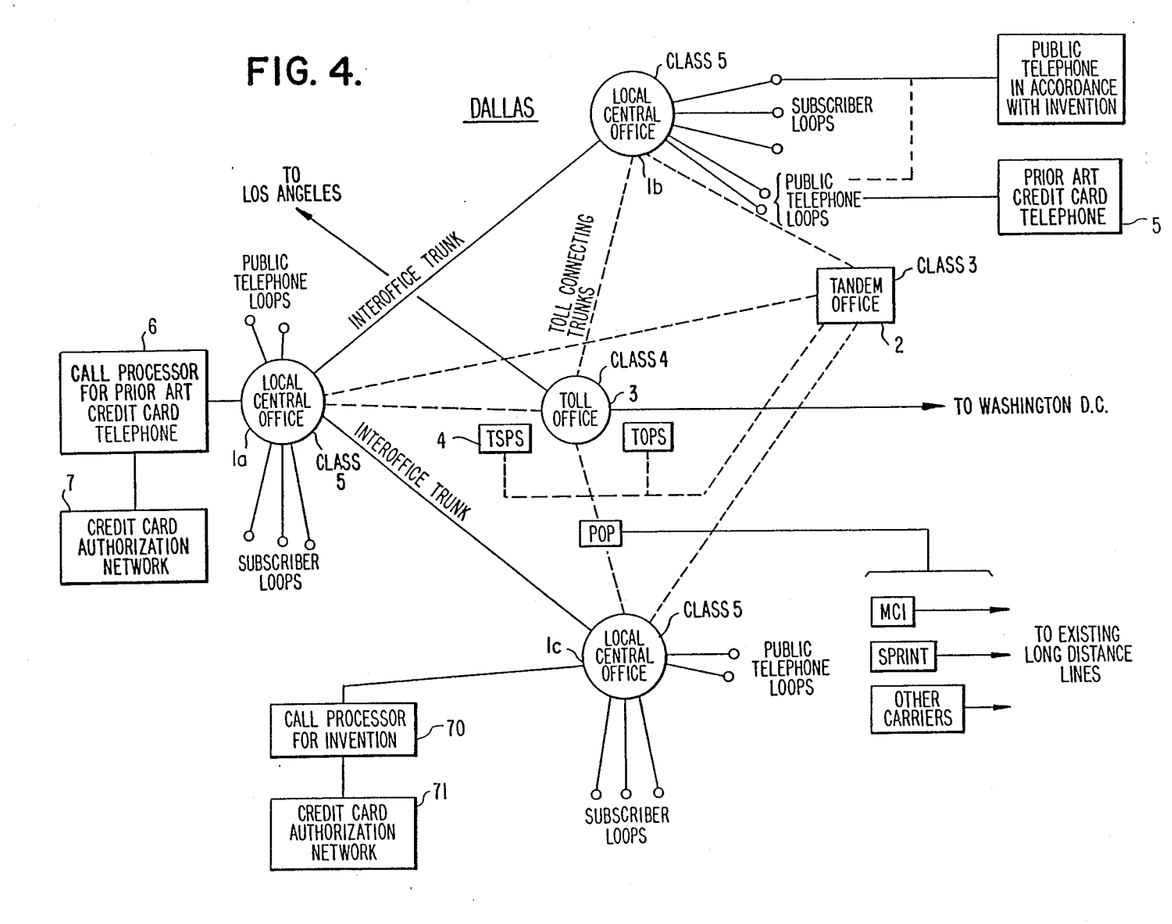
FIG. 4 is a block diagram of the switching centers and subscriber loops of a telephone set system which incorporates the pay telephone set of the present invention.

While the telephone number is being entered by the user, microprocessor 30 places a call through the normal telephone switched network to call processor 70 shown in FIG. 4. This call is placed through network interface 35. In most cases, the user will be unaware that the call is being placed as the double buffering arrangement of user interface 34 and network interface 35 prevents any auditory feedback to handset 43 as a result of the call being placed. Moreover, since the call is being placed while the user is entering the telephone number he wishes to call, completion of the calling process can be accomplished in a much faster period of time. When the connection to call processor 70 is completed, microprocessor 30 sends the user's account information, the serial number of the telephone set being used and the method of payment flag to call processor 70.

Call processor 70 maintains a data base which includes the serial number and geographical location of each telephone set served by the call processor and rate tables which are used to determine the cost of a call between any phone it serves and any geographic location.

Call processor 70 may also be connected to a credit card authorization network 71. Since the method of payment flag indicates that the user has elected to pay for the call with a credit card, call processor 70 varifies that the user's account is in good standing using a data base maintained on the credit card authorization network 71. If the account is in good standing, call processor 70 sends an authorization code back to microprocessor 30 which permits the call to be processed as a credit card call.

After the user has completed entering the telephone number he wishes to call, microprocessor 30 determines whether the call is long distance. If the call is long distance, microprocessor 30 may prompt the user to select a long distance carrier using special function key pad 46 and sets and stores in RAM 31 a carrier select flag in accordance with the selection or the set may be programmed to make an automatic selection of a preferred long distance carrier. RAM 31 also maintains selected rate tables for calls which are routinely placed from the particular telephone set. These tables can be programmed to be specific to an individual telephone set and can vary from set to set. Such a feature would be extremely difficult to implement and maintain in the centralized call pricing systems of the prior art. Microprocessor 30 determines whether the rate tables resident in RAM 31 contain sufficient information to determine the cost of the call. If not, microprocessor 30 sends the telephone number to call processor 70 where the cost of the call is determined from more extensive rate tables within call processor 70. Call processor 70 then sends the cost information to microprocessor 30. The connection with call processor 70 is then terminated. Of course, sufficient memory could be included in the set but this would increase the cost of the set disproportionate to the rarity of the need to retrieve this information.

If the user has elected to pay for the call by coin, microprocessor 30 prompts the user for the amount to be deposited for the first time interval. A coin mechanism 48 is connected to microprocessor 30 via user interface 34 and monitors the coins as they are deposited by the user. Coin mechanism 48 also includes a stuck coin detector. The detector comprises a first coin sensor positioned at the entrance of the coin mechanism and a second sensor positioned at the coin box. If the second sensor is not triggered a predetermined period after the first sensor is triggered, a coin is assumed to be stuck somewhere between. Microprocessor 30 informs the user of this condition via display 45 and/or by a synthesized voice message. As each coin is deposited, microprocessor 30 enables feedback tone generator 62 to provide an auditory response to the user via headset 43. Microprocessor 30 also keeps the user apprised via display 48, as to how much is left to deposit as each coin is entered into coin mechanism 48.

After the user has deposited the correct amount or microprocessor 30 has received a credit card authorization code from call processor 70, microprocessor 30 redials the telephone number entered by the user into the normal switched telephone network and controls handset interface 36 to connect handset 43 to the telephone network as indicated by reference number 38 in FIG. 3. When the party being called answers, an answer signal is detected by microprocessor 30 which then begins to time the duration of the call. If the user is paying for the call by coin, microprocessor 30 prompts the user to deposit additional coins as needed.

At the completion of the call, microprocessor 30 creates a history record of the call for later transmission to call processor 70. The call history record includes such information as the telephone number called, the location and serial number of the telephone set used to make the call, the duration of the call and its cost. A number of call history records may be collected in RAM memory 31 and then be sent to call processor 70 as a group the next time microprocessor 30 is required to connect to call processor 70.

Termination of the short duration initial call to call processor 70 then the redial of the user's call into the normal telephone switched network from the telephone set results in the call entering the network from the central office nearest the telephone set rather than from the central office nearest the call processor. Entry of the call into the switched network from the central office nearest the call processor would likely result in the call having to take a more distant route to its destination, thereby increasing the cost of the call. The telephone set of the present invention avoids this situation. Moreover, the telephone set of the invention can also continue to operate if the call processor which normally serves the set is out of service or is otherwise not available. The telephone set may be programmed such that when this condition occurs, an alternate call processor is called. In addition, since most of the information needed to process a call is stored within the telephone set, the telephone set can process most calls without the assistance of a call processor. Coin calls would continue to be processed in the usual manner. Credit card calls, on the other hand, would have to be automatically approved since credit authorization from the call processor would not be available. Microprocessor 30 would continue to create call history records for each call and would send them to call processor 70 when it once again became available or to a different call processor. Microprocessor 30 may also be programmed to call alternate call processors when the need such as to receive call processing information which would not be economical to store in the call processor which normally serves the telephone set.

The telephone set of the present invention may also be used to place calls using a debit card. A debit card is a credit like card which is magnetically encoded with a dollar amount. Such cards could be purchased from vendors and all calls made using the card would be charged directly to the vendor. When the card is used with the telephone set of the invention, the cost of the call is deducted from the amount on the card and the new balance is written to the card. When the card balance is insufficient to pay for the call, microprocessor 30 informs the user accordingly via display 45. The user must then purchase a new card or an increase of the dollar amount on the existing card. Alternatively, the card could be used merely for identification with the user's balance maintained in a data base accessible by the telephone.

The telephone set of the present invention also permits operation in a coin first or a dial tone first mode. When set up to operate in a dial tone first mode, a local dial tone is provided from dial tone generator 60 to handset 43 as soon as the handset is removed from its cradle as discussed above. Thus, the user need not deposit a coin before using the telephone. In the coin first mode, the user must first deposit a coin before microprocessor 30 enables dial tone generator 60 to provide a dial tone to handset 43. The importance of this feature is that it permits the telephone set to simulate the proper signals to the central office regardless of whether the central office lines are coin first or dial tone first lines. Thus, coin first operation could be provided to the user even if the central office lines were dial tone first lines and vice versa.

Microprocessor 30 also provides coin box monitoring and can be programmed with a schedule of times when the coin box can be unlocked to remove its contents. For example, a service technician would be required to be at the telephone set at the appropriate time with an authorization card which is read by card reader 49. Microprocessor 30 would not permit the coin box to be unlocked until a valid authorization card was read by card reader 49. Since microprocessor 30 maintains a running account of the amount of coins in the coin box and the authorization cards required to unlock the coin box can be identified, employee theft can be substantially reduced.

Figure 5:
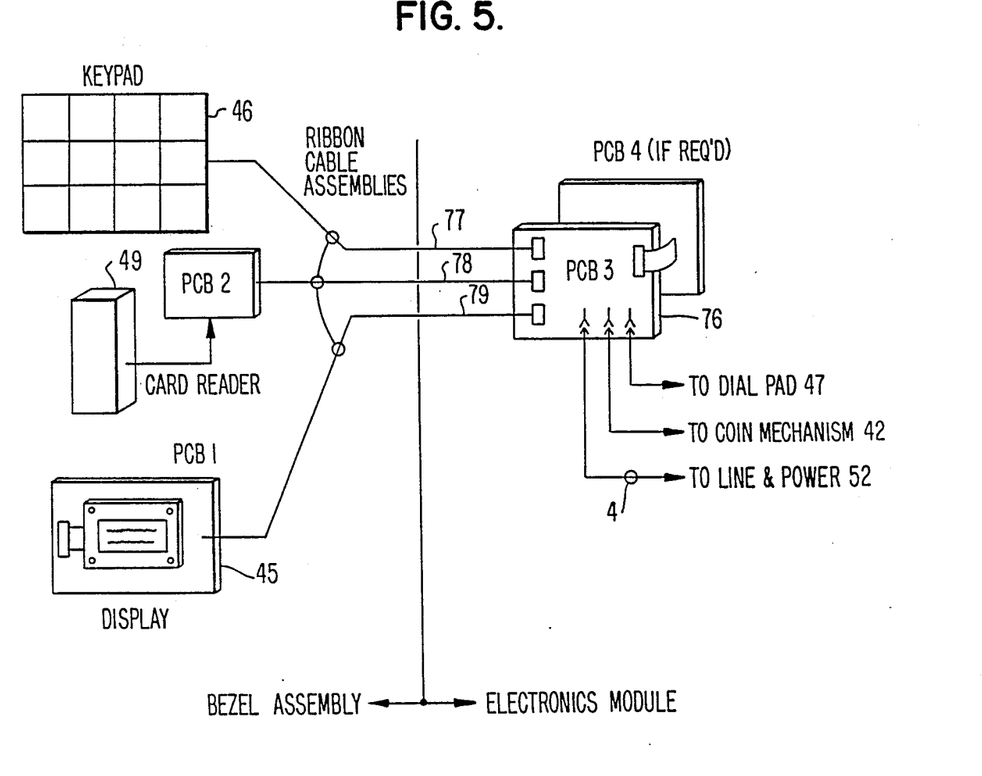
FIG. 5 is a block diagram showing the interconnection of various elements of the pay telephone set of the present invention.

FIG. 5 is a diagram showing how various elements which comprise the pay telephone set of the present invention are interconnected using ribbon cable assemblies. As shown, the dial pad 47 is connected to printed circuit board 76 via the ribbon cable assembly 77; card reader 49 is connected to printed circuit board 75 which is inturn connected to printed circuit board 76 via the ribbon cable assembly 78 and display 45 is connected to printed circuit board 76 via the ribbon cable assembly 79. Printed circuit board 76 is inturn connected to dial pad 47, coin mechanism 48 and power supply 52 via another ribbon cable assembly.

Figure 6:
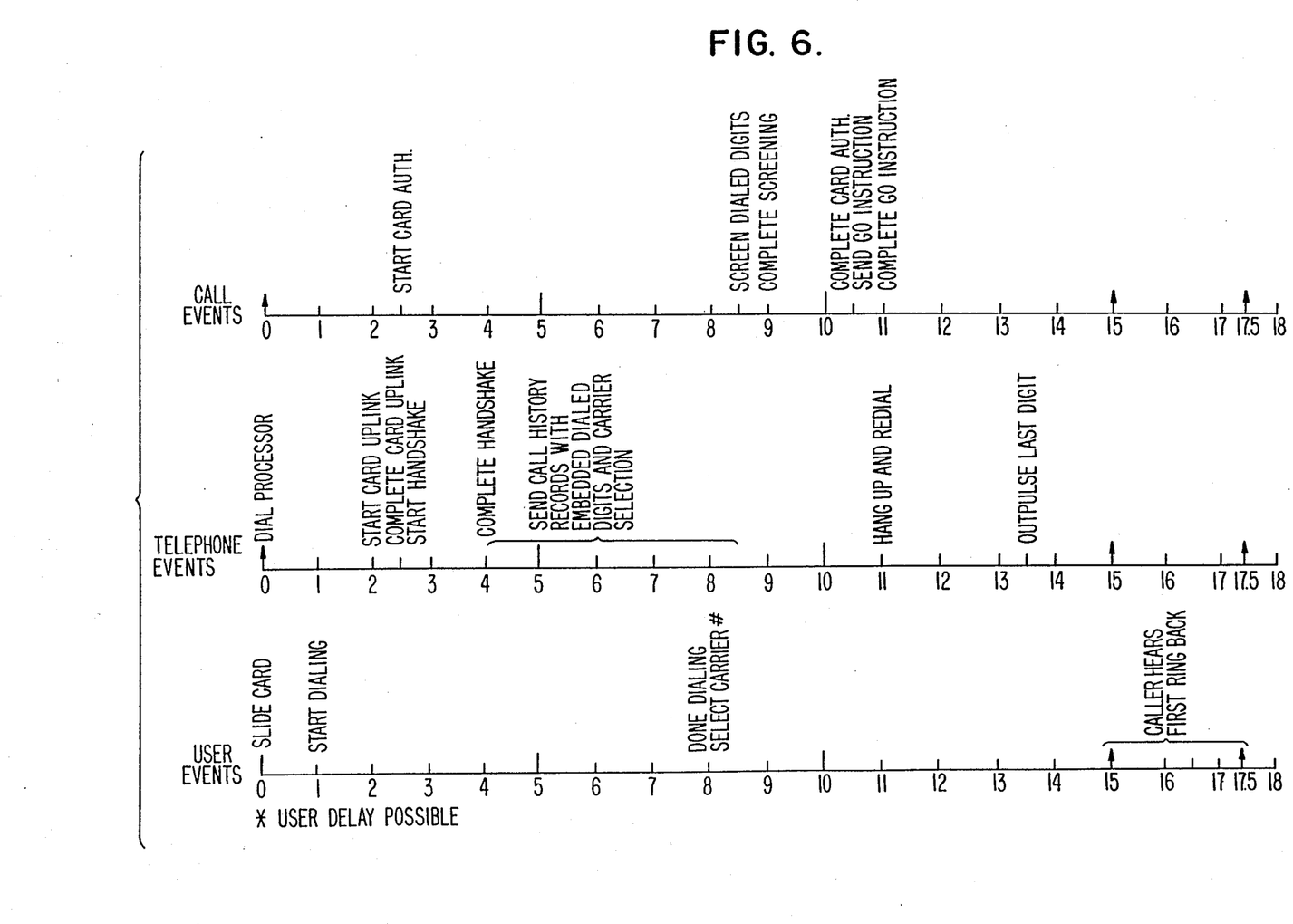
FIGS. 6 and 7 illustrate the event sequences which describe the operation of the pay telephone set of the present invention.
Figure 7:
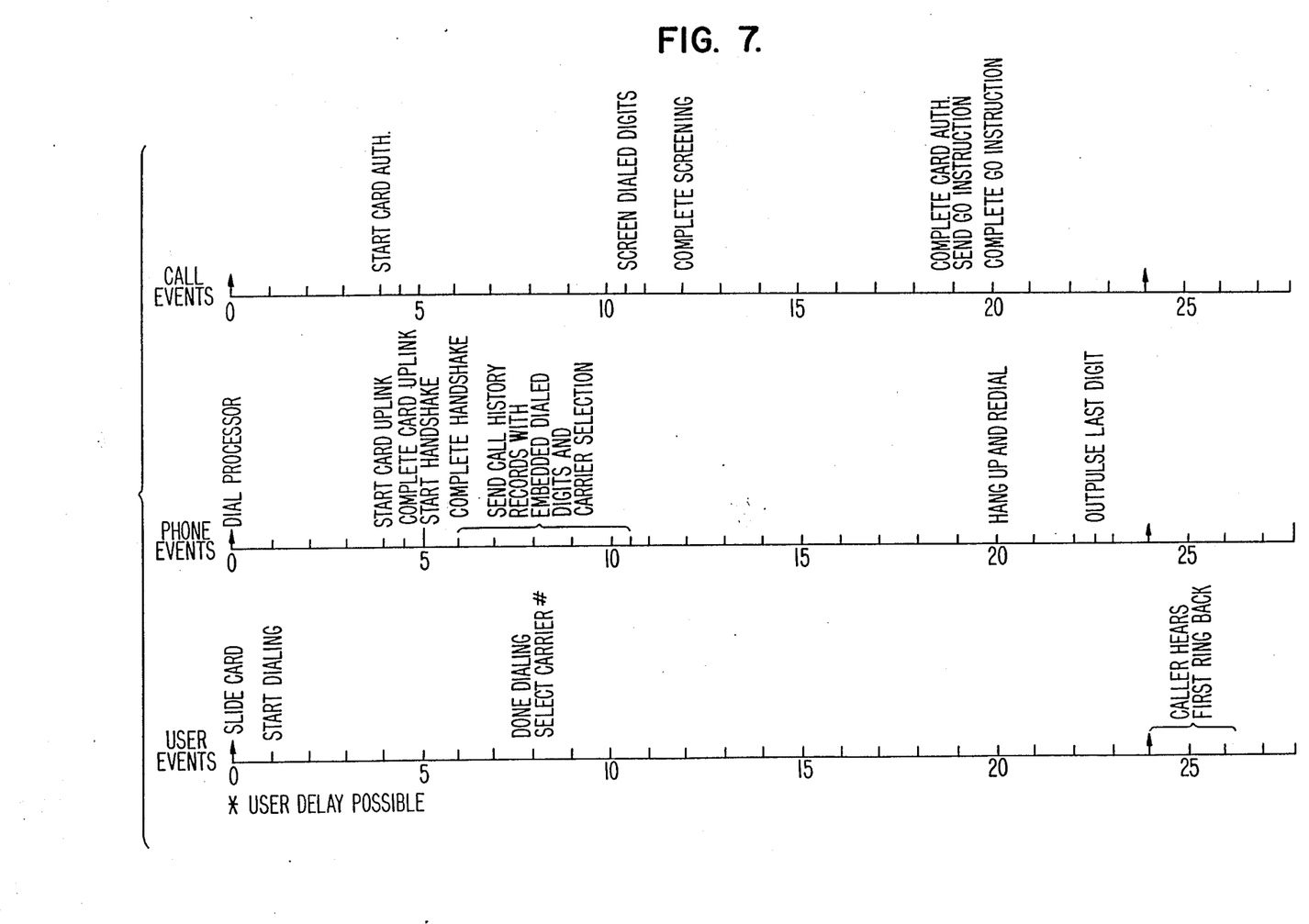

FIGS. 6 and 7 illustrate the sequence and timing of events which occur with respect to the user, the telephone set of the invention and call processor 70 shown in FIG. 4. The events shown in FIG. 6 describe the operation of the telephone set when a credit card call is being placed where microprocessor 30 has already established connection with call processor 70. FIG. 7 also describes the operation of microprocessor 30 when making a credit card call. However, in this sequence of events, microprocessor 30 has not previously established a connection with call processor 70.

Figure 8:
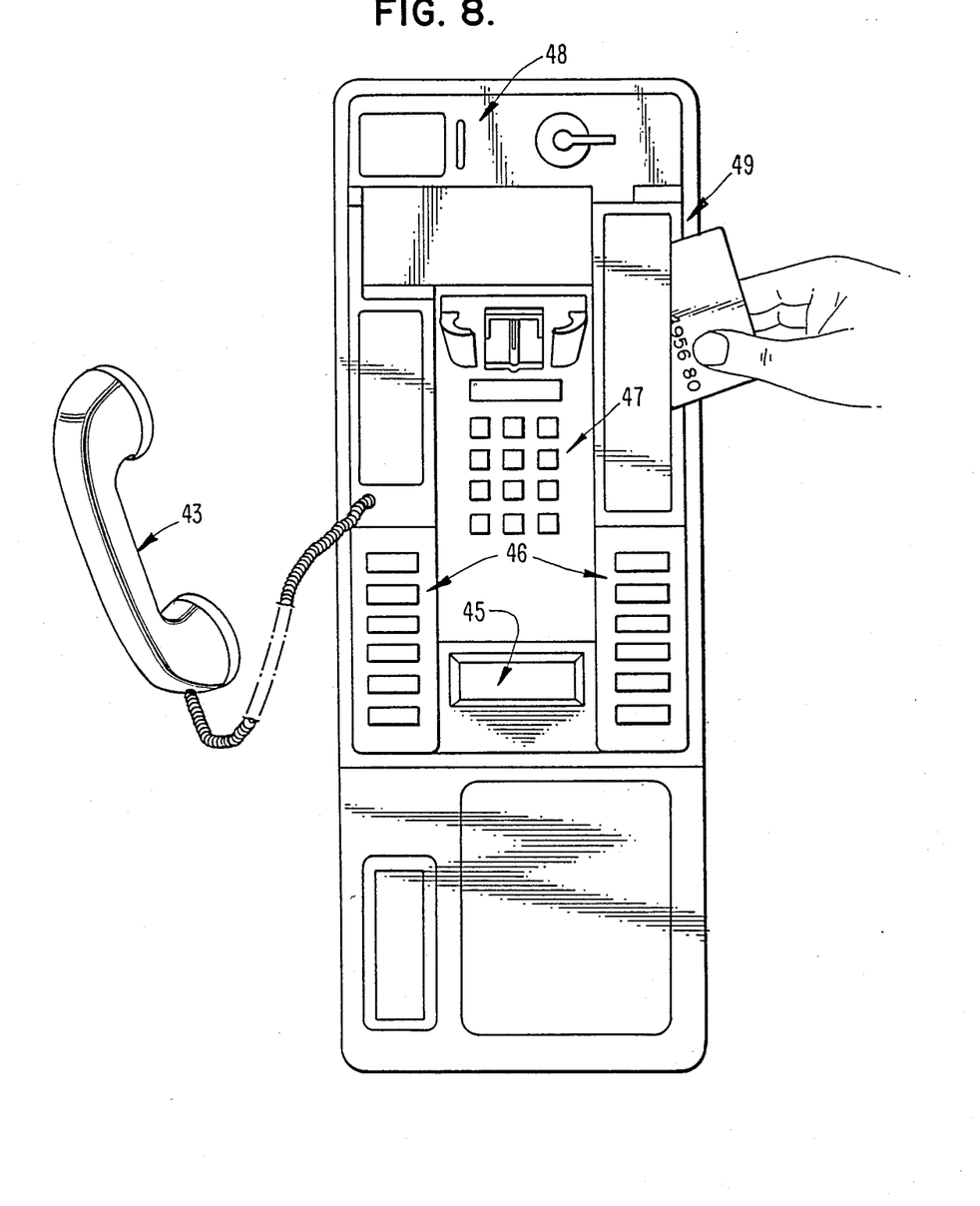
FIG. 8 is an artist's rendition of the pay telephone set of the present invention showing such features as the display and special function buttons.

FIG. 8 is an artist's rendition of the pay telephone set of the present invention showing display 45, special function key pad 46, dial pad 47, coin mechanism 48, card reader 49 and handset 43.

Figure 9:
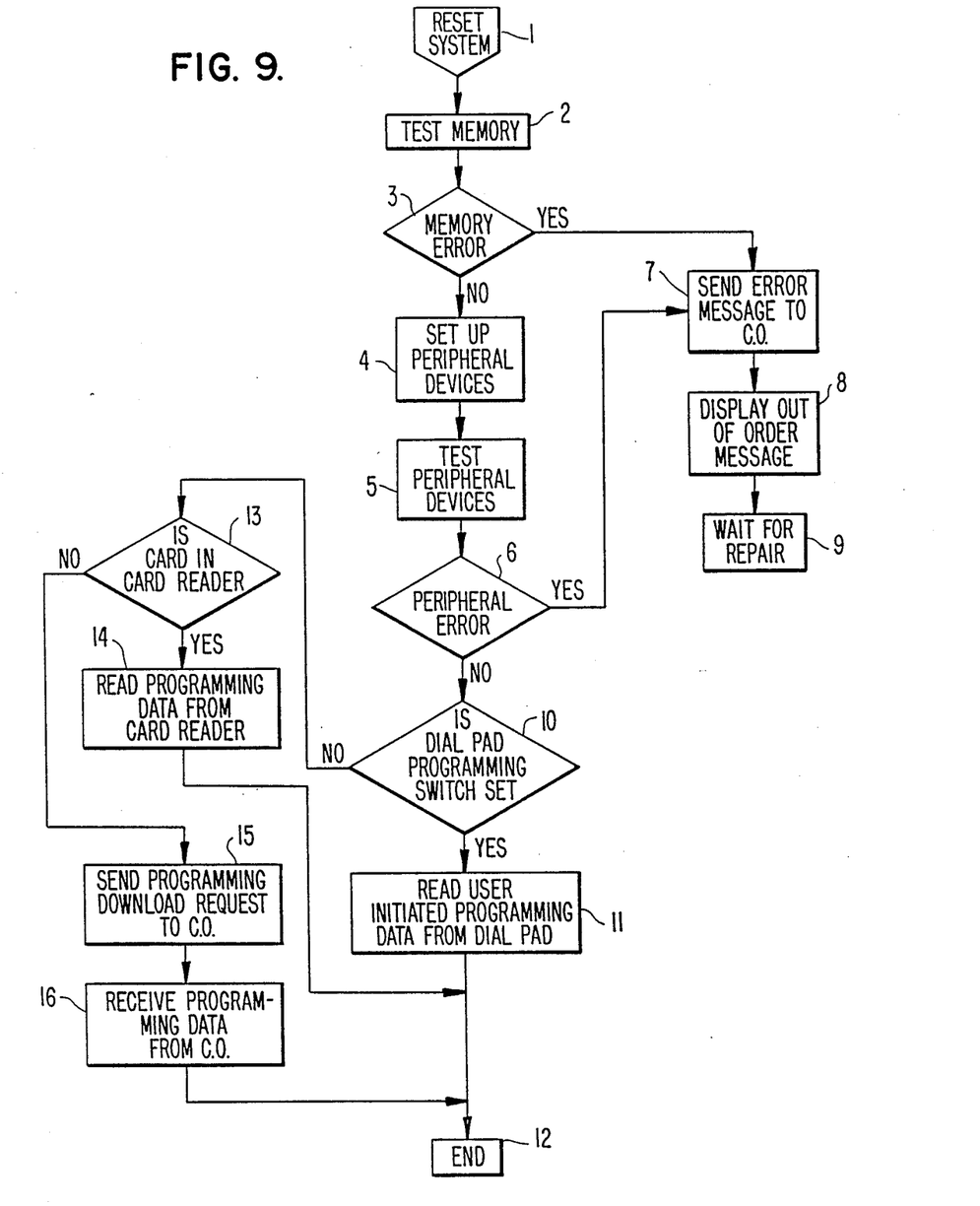
FIGS. 9-12 are flowcharts which describe the operation of the telephone set of the present invention.

FIG. 9 is a flow chart of the cold start reset sequence for the pay telephone set of the invention. During a cold start reset sequence, it is assumed that the only intelligence in the system is that which is stored in ROM 32, i.e., electrical power has been off long enough for any data or program instructions previously stored in RAM to be lost. In block 1, microprocessor 30, and all other system components that require it, are reset by a manual reset button or by power-up-reset circuitry.

In block 2, a test of all RAM, or selected pages or banks of RAM, is conducted by writing a known bit pattern to each memory address and reading it back.

As shown in block 3, when a memory test error occurrs, a number of options are available. Assuming that there is enough "good memory," the system can send a "Memory Test Error" to the central office as indicated in block 7, display an out of order message on the system display as indicated in block 8 and then enter a wait state as indicated in block 9 until the memory error condition is corrected. There may, however, not be enough intelligence resident in ROM to permit all of this occur. Moreover, where a memory failure is severe, the microprocessor is likely to "hang" and not be able to report the source of the problem.

Another approach to testing memory is to initially do a bear bones check of that portion of RAM where the telephone operating system (TOS) will reside. The TOS is the set of programming instructions which controls the operation of microprocessor 30. When loaded, the TOS could then perform a more extensive memory test depending on the level of sophistication desired or practical. The TOS could also be programmed to switch out bad pages or banks of memory and downgrade system performance if needed while maintaining at least a minimum system.

After the memory test is completed with satisfactory results, all peripheral devices are set up in block 4 and checked as shown in block 5. To the extent possible, such devices as the dial pad, keypad and display are tested. Peripheral test errors are handled in the same way as memory test errors (see blocks 6, 7, 8 and 9).

If the check of all peripherals is completed with satisfactory results, a determination is made in block 10 as to how the system will be programmed with the TOS. If the dial pad programming switch is set indicating that the TOS will be manually entered via the keypad, the user is prompted to enter the data as shown in block 11. If the dial pad programming switch is not set, a determination is made whether a programming card is in the card reader. If there is a programming card in the card reader, the TOS is read from the card as shown in block 14. If no programming card is in the card reader, then a programming download request is sent to the central office as shown in block 15. The central office responds by downloading the TOS as shown in block 16. The cold start reset is then concluded in block 12.

The TOS is specifically tailored to meet the operating environment of each telephone set. For example, a telephone set in the lobby of an office building would not require the same operating features as a telephone set in a busy airport. Downloading of the TOS would also include selected rate tables so that the telephone set could independently determine the cost of a call. Thus, the telephone set could continue to operate on many calls if the call processor was not available.

The TOS may also include routines which periodically perform diagnostic tests on the telephone set. Such tests may include the memory and peripherals test shown in the flowchart in FIG. 9. The service information produced by these tests may be stored in RAM 31 and then sent to the call processor at an appropriate time when the telephone set makes a routine call to the call processor.

Figure 10:
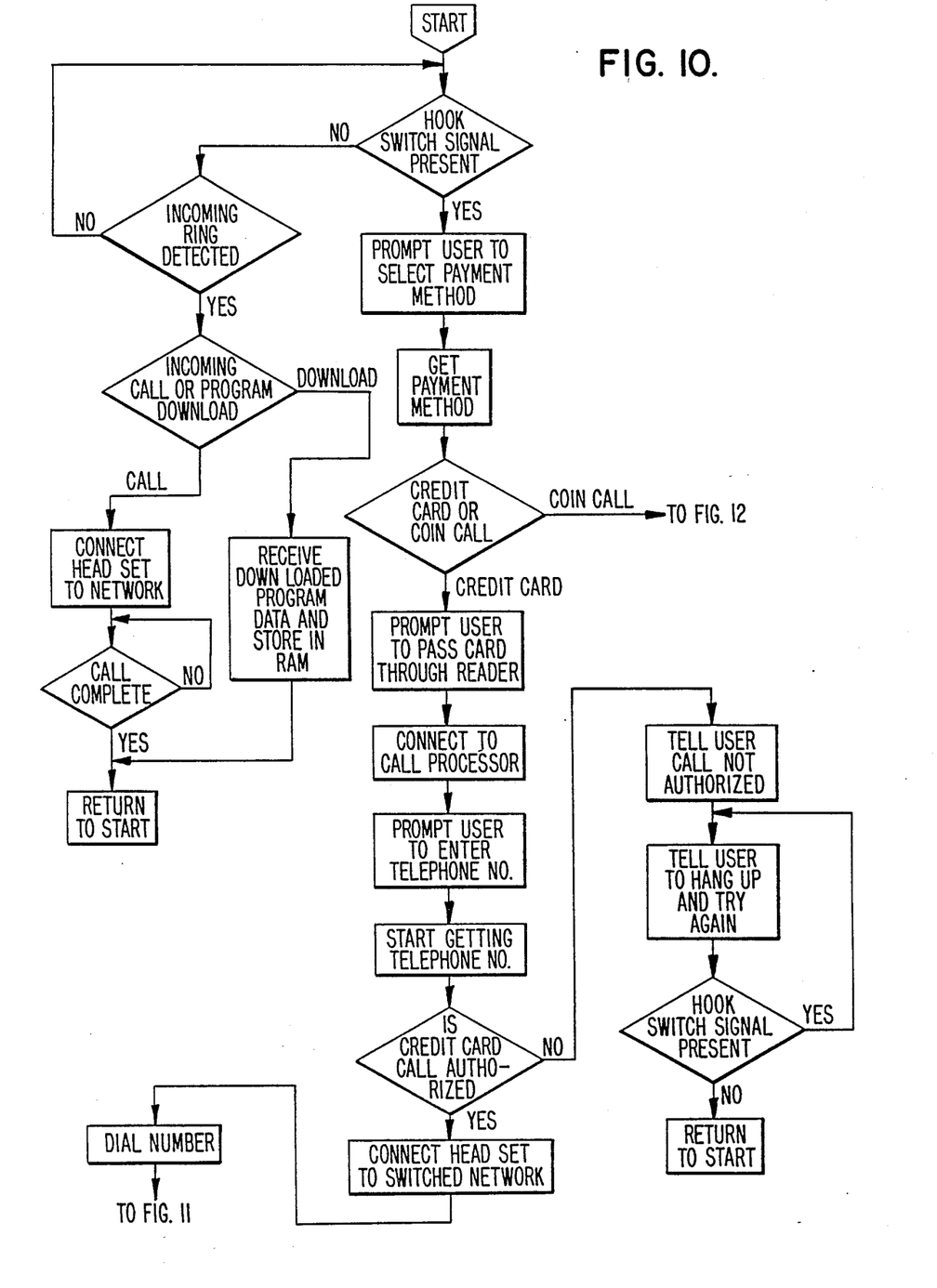
Figure 11:
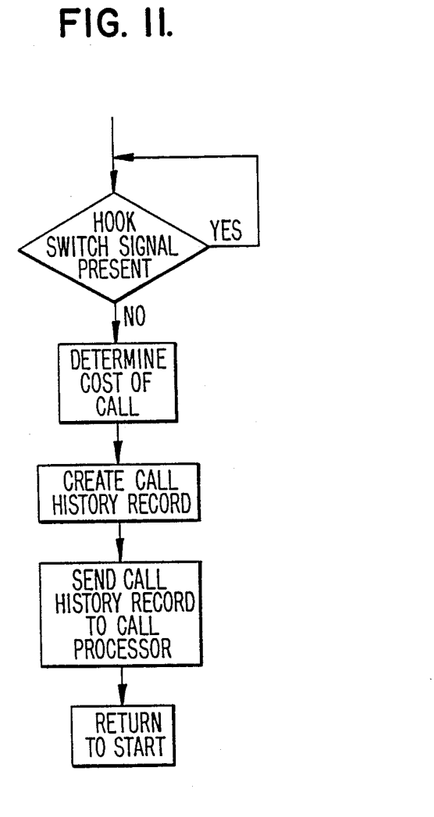
Figure 12:
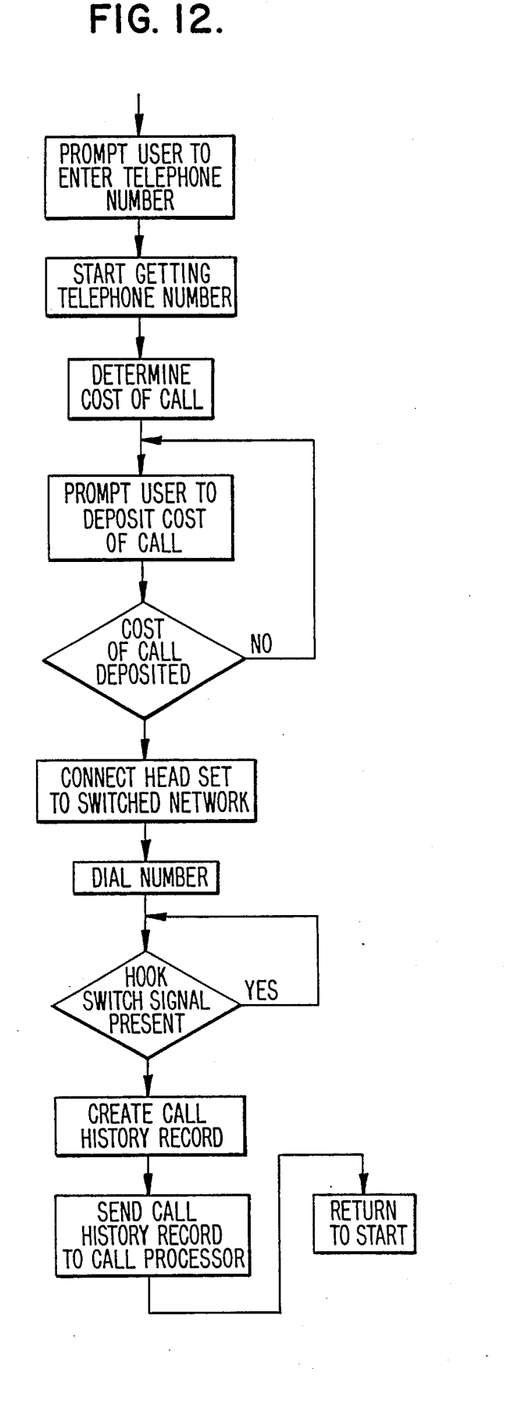

FIGS. 10-12 are flow charts which illustrate the operation of the pay telephone set in accordance with the present invention as described above with respect to FIGS. 3 and 4.

The present invention has been described in detail in connection with a preferred embodiment. Obviously, many modifications and variations of the preferred embodiment will become apparent to those skilled in the art from a reading of this disclosure. It should be realized, however, that the invention is not limited to the particular embodiment disclosed, but its scope is intended to be governed only by the scope of the appended claims.

I claim:

1. A pay telephone for use in a telephone system comprising a plurality of central offices each of which serves a plurality of the subscriber telephones and pay telephones, a conventional switched telephone network connecting together said plurality of central offices, a call processor for providing call billing information for selected calls made from said pay telephone, said call processor being coupled to one of said plurality of central offices and being accessible by calling a predetermined telephone number, said pay telephone comprising:

handset means for transmitting and receiving voice signals to and from the central office which serves said pay telephone;

dial means for entering a user telephone number to be dialed; and a logic circuit coupled to said handset means and to said dial means and adapted to be coupled to the central office which serves said pay telephone, said logic means including memory means for storing the user telephone number received from said dial means, wherein only in response to selected user telephone numbers received from said dial means said logic circuit automatically places a call request to said processor to request and receive desired information from said call processor, said call request being made concurrently with any action performed by the user on said telephone, immediately thereafter said logic circuit terminates said call to said call processor and in response to the receipt of said desired information automatically dials the user telephone number into said switched telephone network through said central office which serves said pay telephone to complete the user's call, when said call request is not made to said call processor said logic means immediately dialing the telephone number into said switch telephone network through said central office.

2. The pay telephone of claim 1 wherein said logic circuit places said call to said call processor while receiving a user telephone number from said dial means.

3. The pay telephone of claim 1 wherein said logic circuit includes means for generating telephone processing information and means for storing said information.

4. The pay telephone of claim 3 wherein said telephone processing information generating means comprises call history generating means for generating a call history for each call placed by said pay telephone, and call history memory means for storing said call history records.

5. The pay telephone of claim 3 wherein said telephone processing information generating means comprises telephone service information generating means for generating telephone service information, and service memory means for storing said service information.

6. The pay telephone of claim 4 wherein said logic circuit further comprises call history transmission means for transmitting said call history to said call processor.

7. The pay telephone of claim 6 wherein said call history is occasionally transmitted along with said request to said call processor.

8. The pay telephone of claim 7 wherein said logic circuit transmits said call history to said call processor only when said logic circuit places a call to said call processor to request said desired information.

9. The pay telephone of claim 1 wherein said desired information requested by said call request is billing information.

10. The pay telephone of claim 1 wherein said desired information requested by said call request is credit information.

11. A pay telephone for use in a telephone system comprising a plurality of central offices each of which serves a plurality of subscriber telephones and pay telephones, conventional switched telephone network connecting together said plurality of central offices, a call processor for providing call billing information for selected calls made from said pay telephone, said call processor being coupled to one of said plurality of central offices and being accessible by calling a predetermined telephone number, said pay telephone comprising:
- handset means for transmitting and receiving voice signals to and from the central office which serves said pay telephone;
- dial means for entering a user telephone number;
- means for generating telephone processing information and means for storing said information; and
- a logic circuit coupled to said handset means and to said dial means and adapted to be coupled to the central office which serves said pay telephone, said logic means including memory means for storing a user telephone number received from said dial means, wherein only in response to selected user telephone number said logic circuit automatically places a call request to said call processor to request desired information from said call processor, said logic means also including means for occasionally transmitting along with said request said stored telephone processing information, when said call request is not made to said call processor said logic means immediately dialing the telephone number into said switch telephone network through said central office.

12. The pay telephone of claim 11 wherein said logic circuit places said call to said call processor while receiving a user telephone number from said dial means.

13. The pay telephone of claim 11 wherein said telephone processing information generating means comprises call history generating means for generating a call history for each call placed by said pay telephone, and call history memory means for storing said call history records.

14. The pay telephone of claim 11 wherein said telephone processing information generating means comprises telephone service information generating means for generating telephone service information, and service memory means for storing said service information.

15. The pay telephone of claim 13 wherein said logic circuit further comprises call history transmission means for transmitting said call history to said call processor.

16. The pay telephone of claim 15 wherein said call history is occasionally transmitted along with said request to said call processor.

17. The pay telephone of claim 16 wherein said logic circuit transmits said call history to said call processor only when said logic circuit places a call to said call processor to request said desired information.

18. The pay telephone of claim 11 wherein said desired information requested by said call request is billing information.

19. The pay telephone of claim 11 wherein said desired information requested by said call request is credit information.

20. A pay telephone for use in a telephone system comprising a plurality of central offices each of which serves a plurality of subscriber telephones and pay telephones, a conventional switched telephone network connecting together said plurality of central offices, a call processor for providing call billing information for selected calls made from said pay telephone, said call processor being coupled to one of said plurality of central offices and being accessible by calling a predetermined telephone number, said pay telephone comprising:
- handset means for transmitting and receiving voice signals to and from the central office which serves said pay telephone;
- dial means for entering a user telephone number;
- a user interface coupled to said handset means and said dial means;
- a network interface adapted to be coupled to the central office which serves said pay telephone;
- a logic circuit coupled to said user interface and to said network interface, said logic means including memory means for storing a user telephone number received from said dial means, wherein in response to selected user telephone numbers said logic circuit automatically places a call request through said network interface to said call processor to request desired information from said call processor, and in response to the receipt of said desired information automatically dials the user telephone number into said switched telephone network to complete the user's call, said call request and receipt of said desired information taking place without being fed back to said handset, when said call request is not made to said call processor said logic means immediately dialing the telephone number into said switch telephone network through said central office.

21. A pay telephone for use in a telephone system comprising a plurality of central offices each of which serves a plurality of subscriber telephones and pay telephones, a conventional switched telephone network connecting together said plurality of central offices, a call processor for providing call information for calls made from said pay telephone, said call processor being coupled to one of said plurality of central offices and being accessible by calling a predetermined telephone number on said pay telephone comprising:

handset means for transmitting and receiving voice signals to and from the central offices which serves said pay telephone;

dial means for entering a user telephone number, and;

logic means coupled to said handset means and to said dial means and adapted to be coupled to the central office which serves said pay telephone, said logic means including memory means for storing a user telephone number received from said dial means, said memory means further storing call information for a set of selected calls;

wherein in response to a telephone number for which no information has been stored in said memory means said logic circuit automatically places a call request to said call processor requesting the call information from said call processor and immediately upon receipt of said information terminates said call to said call processor and thereafter dials said user telephone number into said switched telephone network;

wherein in response to a telephone number for which call information has been stored in said memory means said logic circuit immediately dials user telephone number into said switched telephone network.

* * * * *